June 7, 1966 F. KRONES 3,255,316

PROCESS FOR MEASURING MAGNETIC UNIDIRECTIONAL FIELDS OF LOW INTENSITY, MORE ESPECIALLY FOR CONTROLLING MAGNETIC SOUND INSTRUMENTS AS REGARDS NOISE-FREE UNIDIRECTIONAL FIELD QUALITY

Filed March 8, 1960 2 Sheets-Sheet 1

INVENTOR.
FRIEDRICH KRONES
BY Connolly and Hutz
his ATTORNEYS

June 7, 1966 F. KRONES 3,255,316

PROCESS FOR MEASURING MAGNETIC UNIDIRECTIONAL FIELDS OF LOW INTENSITY, MORE ESPECIALLY FOR CONTROLLING MAGNETIC SOUND INSTRUMENTS AS REGARDS NOISE-FREE UNIDIRECTIONAL FIELD QUALITY

Filed March 8, 1960 2 Sheets-Sheet 2

INVENTOR.
FRIEDRICH KRONES
BY
Connolly and Hutz
his ATTORNEYS 3,255,316
Patented June 7, 1966

3,255,316

PROCESS FOR MEASURING MAGNETIC UNIDIRECTIONAL FIELDS OF LOW INTENSITY, MORE ESPECIALLY FOR CONTROLLING MAGNETIC SOUND INSTRUMENTS AS REGARDS NOISE-FREE UNIDIRECTIONAL FIELD QUALITY

Friedrich Krones, Leverkusen, Germany, assignor to Agfa Aktiengesellschaft, Leverkusen, Germany, a corporation of Germany Filed Mar. 8, 1960, Ser. No. 13,478
Claims priority, application Germany, Mar. 10, 1959, A 31,551
2 Claims. (Cl. 179—100.2)

Figure 1A:
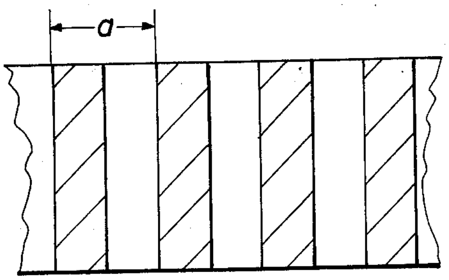
Figure 1B:
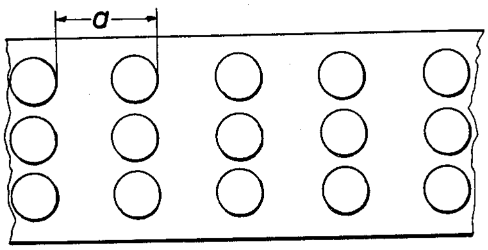

In the magnetic recording of sound, it is very important that the magnetic storage means or tape is magnetically neutral after leaving the erasing head or recording head, i.e. is completely erased and has no remanence. Only then is there no disturbing voltage induced by the storage means in the scanning member, i.e. the reproducing head. Any remanence remaining on the tape causes a disturbing voltage which reduces the dynamic range, i.e. the range between undistorted signal voltage and disturbing voltage.

The undesired generation of unidirectonal field remanence can be caused in various ways. It can for example be produced by magnetized metal parts which constantly contact the storage means or tape in operation. For example, if the magnetic storage means, after leaving the recording head, is led over metal parts which have remanence, a unidirectional remanence which locally fluctuates slightly remains on the tape and these fluctuations produce a noise potential in the sound head.

Furthermore, an undesired generation of the unidirectional field remanence can result from unsymmetrical erasing or biasing currents, for even if all the parts contacting the storage means or tape are carefully demagnetized, unidirectional field remanence can be recorded on the said tape during a recording operation, if the high-frequency erasing or biasing current comprises even-numbered and phase-displaced harmonics.

A very small unidirectional field remanence, which can scarcely be detected acoustically by its noise component, is however very disturbingly noticeable at spliced joints, especially when the splice is at right-angles to the edge of the tape.

A unidirectional field remanence of the tape can also cause deterioration in the print-through attenuation, i.e. amplify the print-through effect. In order to eliminate the disturbing unidirectional field remanence, it is above all essential that this be detected, even when of low intensity. According to the prior known methods, this was not possible with the necessary exactitude.

It has now been found that unidirectional fields of very low intensity can be measured for the purpose of controlling a magnetic storage unit as regards undesired magnetizing influences by using a magnetic storage means or tape of which the magnetic layer is interrupted at constant intervals. If, for the purpose of storage of unidirectional field measurement values, such a magnetic storage means is led past ferromagnetic materials affected by remanence and serving for guiding or magnetization purposes, the resulting unwanted residual unidirectional flux is converted into an alternating flux by the periodic interruption of the magnetic layer and is thereby considerably amplified to a degree sufficient for measurement purposes as well as for acoustic determination. Whereas the unidirectional flux as such cannot be directly assessed, but is only made apparent as a consequence of secondary phenomena, for example as noises due to infinitesimal fluctuations in unidirectional flux which are of second order of smallness, it can readily be ascertained in accordance with the invention. By means of the magnetic storage means or tape, it is possible to localize and correct the sources of error causing the unidirectional flux in the storage means, such as asymmetrical curve form of the erasing or biasing current, or residual magnetism of the magnetic heads or guiding elements.

Figure 1C:
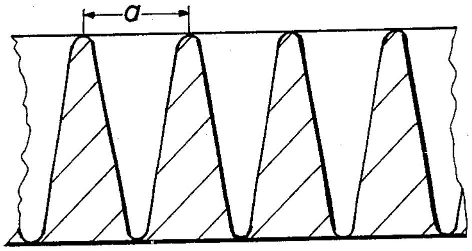
Figure 1D:
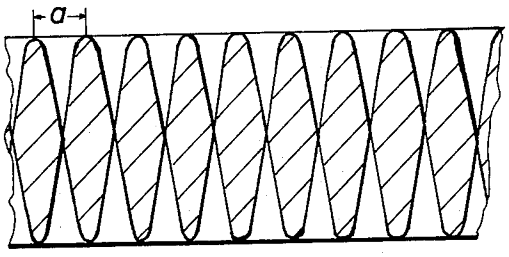
Figure 2:
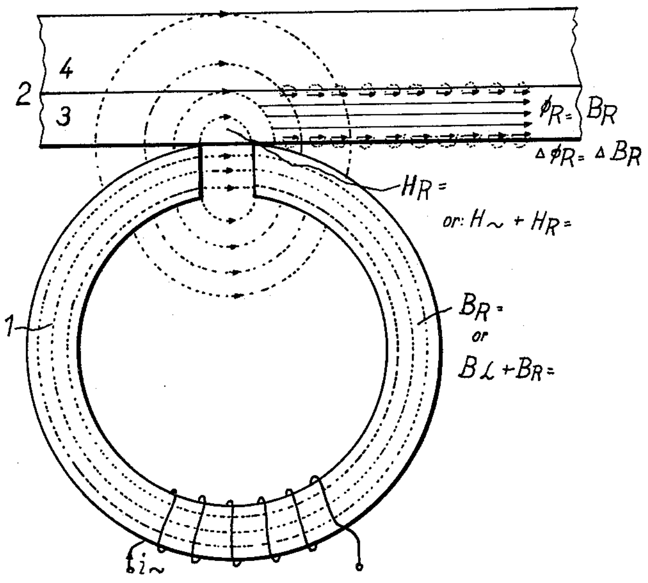

The invention is illustrated in the drawings wherein:

FIGS. 1*a*, 1*b*, 1*c* and 1*d* are plan views of portions of magnetic recording tapes according to the present invention; and FIG. 2 diagrammatically shows its operation.

According to the invention, the breaks in the magnetic layer on the storage means or tape can be carried out in various ways. For example, the magnetized surfaces can be arranged over the entire width of the tape in rung or band formation at right-angles to the tape edge, i.e. at right-angles to the direction of travel of the said tape and parallel to the scanning gap of the sound head, as shown by way of example in FIG. 1*a*. The procedure to be adopted is preferably for the intermediate surfaces to be scraped off during manufacture. It is also possible for the magnetic tape to be perforated, as shown by way of example in FIG. 1*b*. The interruptions or breaks in the layer can be formed by the finished sheet-like magnetic storage means being perforated by punches which are so formed that any desired contour of the stamped-out portion is obtained. The perforated portions may be for example squares, rectangles, circles or other curvilinear forms, which permit the sound produced to be strictly sinusoidal or with high harmonic content, as desired. Furthermore, the magnetic layer can be periodically interrupted when such layer is produced by casting, or the desired surfaces can be applied by a printing matrix or can be sprayed through a template. In all cases, a magnetic layer interrupted at uniform intervals is obtained. Other particular surface formations are represented in FIGURES 1*c* and 1*d*.

If a residual unidirectional field is recorded according to the invention, this produces an alternating voltage chopped or modulated during the reproduction in accordance with the frequency of the breaks between successive coating portions. Depending on the shape of the breaks or interruptions, the resulting voltage can have a rectangular or sinusoidal character. The alternating frequency $f$ which is produced depends on the spacing $a$ of the breaks and the running speed, $v$, and $f=v/a$ if $a$ is the distance between two successive transverse strips of the layer. With a given running speed $v$, the spacing can be so chosen that the frequency being set up is in the transmission range of the transducing unit or falls in the zone of maximum ear sensitivity. The smallest unidirectional field remanence is now indicated, both to a degree required for technical measurement purposes and also acoustically, with a magnitude greater by several orders than hitherto.

This storage means according to the invention can for example be in the form of a tape and can run in the form of a loop on all devices coming into contact with the said tape and can thereafter be directly heard.

The causes of the origin of the disturbing unidirectional flux can thus easily be localized and eliminated by demagnetization and the symmetry of the erasing and biasing current can be perfectly adjusted.

A number of possible uses in the establishment and elimination of the origins of disturbing unidirectional field remanences are set out below.

It frequently occurs that an erasing head, recording head or sound head has a residual remanence $B_{R=}$. Such an arrangement is shown in FIG. 2, for example, in respect of a recording head in which the recording head core and winding are indicated at 1, the magnetic tape at 2, the magnetic layer at 3 and the support at 4.

In the vicinity of the head air gap, a stray field $H_{R=}$ acts on the tape being conveyed past the latter and produces in the tape a unidirectional remanence ${}_1B_{R=}$, which fluctuates somewhat owing to the different remanence values $\Delta B_R$ of the individual iron oxide particles distributed along the tape, and induces a noise potential proportional to $\Delta B_R$.

This noise does not disappear if for example the storage means or tape is thereafter subjected to a fresh magnetization process by a field intensity ($-{}_2H_=$) which generates a reverse remanence sufficient to compensate for the existing unidirectional field remanence, because the second recording is not coherent with the first.

The constant unidirectional flux may then disappear, but not the fluctuations $B_R$.

The above applies to a recording head (or even an erasing head) affected by remanence, the tape engaging said head during the reproduction where no field-inducing current is used. If the same head affected by remanence is used for recording (or in the case of an erasing head for erasing), then because of the perfecting magnetization effect of the superimposed alternating field, the same unidirectional field intensity ${}_1H=$ acting in the gap field owing to the remanence of the toroidal core, now produces a much larger unidirectional field remanence and also a stronger noise.

Residual magnetization can be produced in tape guides by unintentional contact with a magnetic screwdriver and in heads by switching-on impulses of the amplifier. Generally speaking, a complete demagnetization is achieved with a strong demagnetizing choke which is fed from the alternating current mains and which is brought near to all metal components to magnetize them to saturation after which the choke is slowly removed so that its alternating field falls to zero and with it the remanence in the metal components.

An accurate control of the success of the demagnetization was hitherto only possible by a neutral sound record carrier being played back experimentally on an instrument and by judging acoustically whether the noise had disappeared. However, this control method is only accurate to a small degree, because the unidirectional field noise, which increases substantially in proportion with the unidirectional field magnetization, is of the second order of smallness and only amounts to about 1% (−40 db) by comparison with the induced voltage of an alternating field magnetization of equal value, as already mentioned. Valuable recordings which are reproduced on a play-back instrument affected by remanence are then irreparably spoiled, i.e. are provided with a noise component which can no longer be removed. According to the invention, a possibility is provided of accurately testing the apparatus before playing back.

As already briefly mentioned above, even if all components coming into contact with the storage means or tape are carefully demagnetized, a unidirectional field remanence can be recorded on the tape or the like during the recording if the high-frequency erasing or biasing current comprises even-numbered and phase-displaced harmonics.

There is then set up a rectifier effect of the oppositely polarized alternating field amplitudes, resulting in a unidirectional remanence on the tape carrying a superimposed component which induces a noise voltage. The procedure is exactly as if an undistorted erasing or biasing current had had superimposed thereon a signal unidirectional current which records a unidirectional field remanence on the storage means. The effect of the high frequency biasing during the recording operation is that the high-frequency is displaced by an unsymmetrical low frequency signal current which is recorded as remanence on the storage means. In this case, the signal has superimposed thereon a noise component which is known as "modulation noise."

By using push-pull oscillators, it is possible to suppress the even-numbered harmonics of the generated erasing or biasing current and thereby to prevent an undesired unidirectional field recording. However, not all instruments have push-pull oscillators. In these cases, it is possible to compensate for the action of the asymmetrical currents by additionally superimposing a pole-reversible direct current on the biasing current and changing it according to magnitude and direction until the unidirectional field being set up by the asymmetry is compensated and the noise becomes a minimum.

In many practical instruments erasing current is producd symmetrically in a push-pull oscillator, but the HF biasing current is obtained in coupled oscillatory circuits which are matched to the second harmonic in order to obtain a higher frequency synchronised wth the basic frequency of the erasing current. The even-numbered harmonics of the biasing current which are now set up are then corrected in their phase position by a potentiometer until the curve form is symmetrical with respect to the time axis.

Here again the control has hitherto been effected, less accurately, by acoustic means to noise minimum.

Ideal conditions are only produced if the erasing current and the biasing current are taken from a push-pull circuit. Supplementary devices for producing symmetry can then be dispensed with.

As a consequence of the unidirectional field magnetization of the tape, other disturbances are set up in addition to the deterioration in the dynamic characteristics due to the noise, for example the audibility of spliced joints, the deterioration in the print-through attenuation and the distortion factor.

A slight unidirectional field remanence which still can scarcely be found acoustically disturbing because of its noise component is however very disturbingly noticeable at the spliced joints, especially when the splice extends perpendicularly of the tape edge. The residual unidirectional flux is broken and magnetic poles are set up which generate a stray field. In travelling past the sound head gap the entire residual unidirectional flux of the tape sets up in the pick-up windings a voltage impulse which is inversely proportioned to the time required by the gap, travelling at the tape velocity, to pass the sound head gap. The basic frequency of this voltage impulse can appear as a strong or light sharp sound.

The time required to pass the head gap depends largely on the angle formed by the splice with the sound head gap, and is at its shortest and generally most disturbing when both extend parallel, whereas the time is larger and the induced voltage is smaller with an inclined cut.

An estimation of the amplitude ratios should clearly indicate how large the disturbance can be. According to experience, the noise voltage is 1–2% (about −40db) of the induced standard level signal voltage, when there is generated in the tape a unidirectional flux equal to the alternating signal flux of the tape, which is established as a standard level at 200 millimaxwell. If an inaudible minimum of the noise voltage is achieved by symmetry measures, this minimum is at $\frac{1}{1000}$=1% (−60 db.), when the disturbing voltage ratio of a good instrument and thus also the limit of acoustic decision is assumed to be −60 db. The instrument or aparatus is to be set acoustically to noise minimum with an uncut tape. The unidirectional flux can accordingly only be reduced with certainty to about $\frac{1}{10}$ (−20 db) of its full value by acoustic estimation and estimation on standards used in the measuring technique, and better settings are left to chance.

Owing to the break in the unidirectional flux by a spliced joint, this flux reduced to $\frac{1}{10}$ becomes noticeable as an induced voltage impulse with an amplitude of about $\frac{1}{10}$ (−20 db) of the standard level and, depending on its basic frequency, which is established by the speed and gap width of the spliced point, is clearly and subjectively audible with more or less disturbing effect.

The time can be lengthened if an inclined cut is used. The induced voltage then becomes smaller and will in many cases remain practically inaudible. However, spliced joints are only completely inaudible when the unidirectional flux disappears.

It is consequently of decisive importance as regards the audibility of spliced joints that the smallest possible components of a unidirectional remanence on the magnetic storage means disappear, these components might not be detected acoustically as noises with an uncut magnetic storage means, since this noise is still only about 1% (−60 db).

With the symmetrical tape according to the invention, an extremely sensitive control as regards the presence of a residual unidirectional flux of a magnetic storage means is possible, since the unidirectional flux converted into an alternating flux is now apparent acoustically and also on a scale suitable for measuring techniques with a strength which is 2–3 powers of ten stronger. It can consequently be reduced at least to 1% (−60 db).

Furthermore, a unidirectional remanence extending over the entire length of the tape, such as can arise because of the causes set forth above, causes a deterioration in the print-through attenuation or intensifies the print-through effect, because now the action of the per se very weak signal field intensity of an adjacent convolution with a strong signal recording can be quite substantially amplified. Whereas the signal field intensity originating from the adjacent convolution originally produces an infinitely small print-through remanence on a neutral, i.e. demagnetized, sound carrier, since the process takes place in the reversible range in the vicinity of the origin, a unidirectional field remanence existing on the tape acts as a biasing field intensity. The operating point is displaced into the steep portion of the remanence characteristic and the result is a substantially stronger printed-through. The noise ratios are the same as described above.

A unidirectional remanence of the tape impairs both the noise ratio and the print-through attenuation of a tape. The displacement of the operation point causes a reduction of the range of control of the remanence characteristic or curve, and thus a deterioration in the distortion factor or reduction of the distortion attenuation.

It is therefore a particular advantage of the present process that it is possible by measuring and eliminating unidirectional fields of low intensity in magnetic storage means to produce an improvement of the signal-to-noise ratio, the attenuation of print-through and distortion, the avoidance of interference due to spliced joints and also to prevent an irreparable reduction in quality by playing back a satisfactory recording through a magnetized apparatus.

The magnetic storage means or tape can also be used for controlling the synchronism of a driving system, fluctuations in synchronism being made apparent as fluctuations in frequency. An unintentional erasure at any time by magnetization, for example by approach of a permanent magnet, can thereby be obviated.

Furthermore, the magnetic storage means can be used as a sound frequency generator, the change in frequency being effected by changing the running speed. It can be erased as often as desired by an alternating field and the original wavelength can be again produced in a simple manner by re-magnetization with an adjacent permanent magnet, this wavelength again producing the same frequency at the same speed. By suitable shaping of the breaks or interruptions in the layer or of the layer sections, any desired tone quality can be produced.

Instead of the magnetic storage means being in the form of a tape, it can also be in the form of a filament or disc, the breaks in the layer being adapted to the shape of the storage means. For amplifying the remanence, it is possible for a high frequency alternating field which is produced by a small air gap to be caused to act in addition to the unidirectional field to be measured, whereby the small unidirectional field produces a greater remanence than without the alternating field. Care is to be taken that the alternating field subsides before the storage means leaves the unidirectional field to be measured, by having the alternating current travel through a loop comprising only a few turns of wire, the dimensions of which are small in relation to the extent of the unidirectional field to be measured. By using this "perfect" magnetization a remanence greater by several powers of ten is produced by an infinitely small unidirectional field than without the action of the perfecting alternating field. With the aid of the storage means, the unidirectional flux is converted into an alternating flux, whereby the alternating voltage induced in the sound head can be measured in practice with any desired degree of accuracy by an additional voltage amplification. On the other hand, in order to evaluate the unidirectional field without this storage means, highly sensitive measuring devices would be essential, the accuracy of which would be smaller by several orders of magnitude.

*Example*

As a magnetic record carrier there is used a magnetic tape as disclosed in Example 1 of the German patent specification 814,225. The magnetic layer with a thickness of 10–20$\mu$ of said tape is scraped off with a milling machine at right angles to the tape edge forming breaks at constant intervals 2 mm. broad over the entire width of the tape. The remaining transverse strips of the magnetic layer are also 2–3 mm. broad (FIG. 1*a*).

A residual unidirectional field recorded by means of this magnetic tape is reproduced as a modulated alternating voltage. With the usual running speed of for example 76 or 38 cm./sec. a frequency is set up being in the transmission range of the unit or falling in the zone of the maximum ear sensitivity. In this way it is possible to localize and to exclude the sources causing the unidirectional flux in the magnetic tape.

What is claimed is:

1. A process for testing a magnetic sound recording instrument for undesired unidirectional magnetic fields, said magnetic sound recording instrument having heads for recording, erasing and reproducing signals with air gaps extending perpendicularly to the direction of travel of the magnetic recording tape, said process comprising passing a magnetic recording tape along the heads through the said magnetic sound recording instrument, the magnetic recording tape having a uniform succession of longitudinal spaced bands of a magnetizable layer extending perpendicularly to the longitudinal direction of the tape and which repeat themselves at a rate that falls in the range of maximum auditory sensitivity, whereby upon passing the magnetic recording field the indicated bands of magnetizable layers are magnetized; passing said magnetized magnetic recording tape along a reproduction device to induce therein an alternating field and thereafter measuring the alternating flux.

2. The process of claim 1 wherein testing is carried out while imposing a high frequency bias on the tape to increase the magnetization it undergoes by the residual permanent magnetization being tested.

References Cited by the Examiner

UNITED STATES PATENTS

| | | | |
|---|---|---|---|
| 1,656,216 | 1/1928 | Melby | 179—100.2 |
| 2,673,897 | 3/1954 | Rettinger | 179—100.2 |
| 2,782,043 | 2/1957 | Andrews | 274—41.4 |
| 2,876,295 | 3/1959 | Irby | 179—100.2 |
| 2,906,827 | 9/1959 | Gordon et al. | 179—100.2 |
| 2,919,314 | 12/1959 | Holt | 179—100.2 |
| 2,957,953 | 10/1960 | Woodward | 179—100.2 |

FOREIGN PATENTS

| | | |
|---|---|---|
| 1,023,945 | 2/1958 | Germany. |

OTHER REFERENCES

Techniques of Magnetic Recording, J. Tall, pages 127–128, 1958, The MacMillan Co., New York, N.Y.

IRVING L. SRAGOW, *Primary Examiner.*

NEWTON N. LOVEWELL, BERNARD KONICK, *Examiners.*

R. SEGAL, H. D. VOLK, *Assistant Examiners.*